US012006056B2

(12) United States Patent
Roberts (10) Patent No.: US 12,006,056 B2
(45) Date of Patent: Jun. 11, 2024

(54) DUAL DRIVE HYBRID ELECTRIC POWER PLANT FOR AIRCRAFT

(71) Applicant: Hybrid Project LLC, Blountville, TN (US)

(72) Inventor: Shane Roberts, Blountville, TN (US)

(73) Assignee: Hybrid Project LLC, Blountville, TN (US)

( * ) Notice: Subject to any disclaimer, the term of this patent is extended or adjusted under 35 U.S.C. 154(b) by 30 days.

(21) Appl. No.: 17/514,099

(22) Filed: Oct. 29, 2021

(65) Prior Publication Data

US 2022/0144439 A1 May 12, 2022

Related U.S. Application Data (60) Provisional application No. 63/107,183, filed on Oct. 29, 2020.

(51) Int. Cl.
| | | |
|---|---|---|
| *B64D 35/08* | (2006.01) | |
| *B64D 27/02* | (2006.01) | |
| *B64D 27/24* | (2006.01) | |
| *F02B 61/04* | (2006.01) | |
| *F02N 11/04* | (2006.01) | |

(52) U.S. Cl.
CPC ............. *B64D 35/08* (2013.01); *B64D 27/24* (2013.01); *F02B 61/04* (2013.01); *F02N 11/04* (2013.01); *B64D 27/026* (2024.01)

(58) Field of Classification Search
CPC .. B64D 35/08; B64D 27/24; B64D 2027/026; F02B 61/04; F02N 11/00; F02C 7/32; F02C 7/36; F16D 23/02
See application file for complete search history.

(56) References Cited

U.S. PATENT DOCUMENTS

| | | | |
|---|---|---|---|
| 2006/0081433 A1* | 4/2006 | Skorucak | F16D 23/02 |
| | | | 192/12 D |
| 2013/0227950 A1* | 9/2013 | Anderson | F01B 21/00 |
| | | | 60/718 |
| 2017/0321601 A1* | 11/2017 | Lafargue | F02C 6/206 |
| 2018/0283464 A1* | 10/2018 | Altamura | F02C 7/32 |
| 2019/0118941 A1* | 4/2019 | Iskrev | B64C 11/306 |
| 2019/0323473 A1* | 10/2019 | Namuduri | H02K 11/0094 |
| 2020/0400198 A1* | 12/2020 | Larsson | B60K 6/46 |
| 2021/0180654 A1* | 6/2021 | Barrientos Blanco | B64C 37/00 |
| 2021/0293184 A1* | 9/2021 | Karpik | F16D 9/08 |
| 2021/0316874 A1* | 10/2021 | Resnick | B60L 3/0023 |
| 2022/0033097 A1* | 2/2022 | Botti | B64D 27/24 |
| 2022/0307455 A1* | 9/2022 | Gosavi | F02N 15/063 |
| 2023/0016164 A1* | 1/2023 | Chatelois | F02K 5/00 |

* cited by examiner

*Primary Examiner* — Joshua J Michener
*Assistant Examiner* — Cindi M Curry
(74) *Attorney, Agent, or Firm* — Blanchard Horton PLLC (57) ABSTRACT

A dual drive hybrid electric power plant to power an aircraft comprises a propulsion assembly, an internal combustion engine having an output shaft configured to drive the propulsion assembly, and an electric motor configured to drive the propulsion assembly and to be selectively coupled to the output shaft. The power plant may be configured such that the electric motor alone drives the propulsion assembly, or such that the internal combustion engine and the electric motor drive the propulsion assembly.

16 Claims, 7 Drawing Sheets

DUAL DRIVE HYBRID ELECTRIC POWER PLANT FOR AIRCRAFT

REFERENCE TO RELATED APPLICATIONS

This application claims the benefit of U.S. Provisional Patent Application No. 63/107,183 entitled "Dual Drive Hybrid Electric Power Plant for Aircraft" filed Oct. 29, 2020, which is incorporated by reference in its entirety.

BACKGROUND

Many aircraft use fossil-fuel engines to operate propeller-based propulsion systems that provide the necessary thrust and subsequent lift for sustained flight. These aircraft include airplanes, helicopters, drones, and the like, and may have on-board pilots, operators, and/or passengers or have no people on-board. These aircraft may have on-board control systems, remotely-located control systems (such as control systems on the ground or elsewhere outside the aircraft), a combination, or the like. The fossil-fuel engines maybe internal combustion engines, turbines such as turbofans, or the like. The fossil-fuel may be gasoline, kerosine, aviation fuel, natural gas, propane, a combination, or the like. An aircraft may have one or multiple fossil-fuel engines, each operating at least one propeller-based propulsion system. These engines can be very noisy especially at full power such as during taking-offs. For certain locations, these engines may be too noisy even during lower power operations such as landing.

These aircraft typically have required-power profiles that vary dramatically during flight operations. For example, the required-power for take-offs, climbing (increasing altitude), and maneuvering usually is significantly higher the required-power for cruising (maintaining speed and altitude) and landing. Since the fossil-fuel engine is selected or sized to provide the maximum required-power, the engine does not operate as efficiently as a smaller engine would at the lower required-power levels. The variable required-power profile plus the additional weight of an engine selected/sized for maximum required-power operation increases the fuel consumption of the aircraft for flight operations, which increases operating costs and increases the production of greenhouse gases associated with global climate change.

In aircraft with a single engine operating a single propeller, an engine shutdown during flight would have a dramatic effect on the aircraft's continued operation and would often result in damage or destruction of the aircraft with associated harm to people in the aircraft and may harm people on the ground. The engine may shutdown because of mechanical failure, loss of fuel, or like events. Aircraft with multiple engines would have similarly-related difficulties from an engine shutdown though not usually as catastrophic. While multi-engine aircraft are designed to maintain flight operations with less than all engines or even only one engine operating, the aircraft may not be able to maintain flight operations if poor weather conditions or other factors are present.

As can be seen from the above description, there is an ongoing need to improve the safety, reduce the fossil-fuel consumption, and reduce the noise of fossil-fuel engines in aircraft. The present invention overcomes at least one of the disadvantages associated with conventional devices and avoids or ameliorates at least some of the disadvantages of conventional devices.

SUMMARY

According to various example embodiments of the present general inventive concept, a dual drive hybrid electric power plant for aircraft is provided that has both an internal combustion engine and an electric motor for driving a propulsion system. The hybrid electric power plant has a primary or hybrid mode of operation and a secondary or electric only mode of operation. During the primary mode, the internal combustion engine and the electric motor form a hybrid system for driving the propulsion system. During the secondary mode, the electric motor drives the propulsion system alone. Various example embodiments of the present general inventive concept may also include a coupling system that allows the coupling and decoupling of the internal combustion engine with the electric motor for the primary and secondary modes, respectively. Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a dual drive hybrid electric power plant to power an aircraft, comprising a propulsion assembly, an internal combustion engine having an output shaft configured to drive the propulsion assembly, an electric motor configured to drive the propulsion assembly and to be selectively coupled to the output shaft, and a coupling assembly configured to selectively couple and decouple the electric motor from the output shaft. Various additional aspects and advantages of the present general inventive concept may be achieved in which the electric motor alone drives the propulsion assembly when decoupled from the output shaft, and where the internal combustion engine and the electric motor drive the propulsion assembly when the electric motor is coupled to the output shaft.

Various additional aspects and advantages of the present general inventive concept may be achieved in which bearings in the electric motor do not rotate when the internal combustion engine and the electric motor drive the propulsion assembly. Various additional aspects and advantages of the present general inventive concept may be achieved in which a decoupling actuator of the coupling assembly is not in contact with any moving parts of the power plant when the internal combustion engine and the electric motor drive the propulsion assembly. Various additional aspects and advantages of the present general inventive concept may be achieved in which the electric motor works in conjunction with the internal combustion engine as a starter, power booster, and generator when the internal combustion engine and the electric motor drive the propulsion assembly. Various additional aspects and advantages of the present general inventive concept may be achieved in which the electric motor is configured to drive the propulsion assembly alone if the internal combustion engine fails or to reduce the noise output of the propulsion assembly. Various additional aspects and advantages of the present general inventive concept may be achieved in which the electric motor is configured to drive the propulsion assembly alone to reduce the noise output of the propulsion assembly.

The foregoing and/or other aspects and advantages of the present general inventive concept may further be achieved by providing a dual drive hybrid electric power plant for an aircraft comprising an internal combustion engine, a dual drive system connected to the internal combustion engine, where the dual drive system has an electric motor, and a propulsion system connected to the dual drive system. Various additional aspects and advantages of the present general inventive concept may be achieved in which the dual drive system has a selective connection between the internal combustion system and the propulsion system. Various additional aspects and advantages of the present general inventive concept may be achieved in which the selective connection is one of a mechanical connection and a mechanical disconnection. Various additional aspects and advantages of the present general inventive concept may be achieved in which the internal combustion system and electric motor drive the propulsion system when the selective connection is a mechanical connection. Various additional aspects and advantages of the present general inventive concept may be achieved in which the electric motor alone drives the propulsion system when the selective connection is a mechanical disconnection.

Various additional aspects and advantages of the present general inventive concept may be achieved in which the dual drive system comprises a base plate axially mounted on the internal combustion engine by at least one mounting bolt, a dual drive shaft extending from the internal combustion engine toward the propulsion system and through an axis opening formed by the base plate, where the dual drive shaft forms a shaft spline extending axially on an outside circumference, where the dual drive shaft forms a lip adjacent to the internal combustion engine, a compression spring disposed axially on the dual drive shaft against the lip, a dual drive dog slide-ably disposed on the dual drive shaft, the dual drive dog forming an internal bore and forming a dog spline extending axially on an inside circumference of the bore, where the dual drive shaft extends axially through the bore of the dual drive dog, the dog spline registers with the shaft spine, where the dual drive dog engages the compression spring against the lip of the dual drive shaft, a decoupling actuator forming a cavity, the decoupling actuator fits around and engages the dual drive dog along a circumferential edge, an electric motor stator axially aligned along the outside of the decoupling actuator, where the electric motor stator has a dual drive piston disposed between the electric motor stator and the decoupling actuator, and a propulsion dog axially mounted on the inside of a propellor base in the propulsion system.

Various additional aspects and advantages of the present general inventive concept may be achieved in which the dual drive dog has one of a coupled connection and a decoupled disconnection with the propulsion dog. Various additional aspects and advantages of the present general inventive concept may be achieved in which the internal combustion engine and the electric motor drive the propulsion system when the dual drive dog has a coupled connection with the propulsion dog, and where the electric motor alone drives the propulsion system when the dual drive dog has a decoupled disconnection with the propulsion dog. Various additional aspects and advantages of the present general inventive concept may be achieved in which the dual drive piston has an extended position when the dual drive dog has a decoupled disconnection with the propulsion dog, and where the dual drive piston has a nonextended position when the dual drive dog has a coupled connection with the propulsion dog.

Various additional aspects and advantages of the present general inventive concept may be achieved in which the internal combustion engine is a 2-cycle engine. Various additional aspects and advantages of the present general inventive concept may be achieved in which the internal combustion engine is a turbofan engine. Various additional aspects and advantages of the present general inventive concept may be achieved in which the internal combustion engine uses gasoline. Various additional aspects and advantages of the present general inventive concept may be achieved in which the propulsion system comprises a propellor connected to a propellor base by a propellor bolt.

The foregoing and/or other aspects and advantages of the present general inventive concept may further be achieved by providing a dual drive hybrid electric power plant for an aircraft comprising an internal combustion engine, a dual drive system having an electric motor, and including a base plate axially mounted on the internal combustion engine by at least one mounting bolt, a dual drive shaft extending from the internal combustion engine toward the propulsion system and through an axis opening formed by the base plate, where the dual drive shaft forms a shaft spline extending axially on an outside circumference, where the dual drive shaft forms a lip adjacent to the internal combustion engine, a compression spring disposed axially on the dual drive shaft against the lip, a dual drive dog slide-ably disposed on the dual drive shaft, the dual drive dog forming an internal bore and forming a dog spline extending axially on an inside circumference of the bore, where the dual drive shaft extends axially through the bore of the dual drive dog, the dog spline registers with the shaft spine, where the dual drive dog engages the compression spring against the lip of the dual drive shaft, an electric motor stator axially aligned along the outside of the decoupling actuator, and a propulsion system having a propellor connected by a propellor bolt to a propellor base, where the propulsion dog is axially mounted inside of a propellor base, where the propulsion dog registers with the dual drive dog, where the internal combustion system and electric motor drive the propulsion system when fuel is injected in the internal compression engine, and where the electric motor alone drives the propulsion system when the fuel is not injected in the internal compression engine.

Various additional aspects and advantages of the present general inventive concept may be achieved in which the internal combustion engine is a 2-cycle engine. Various additional aspects and advantages of the present general inventive concept may be achieved in which the internal combustion engine is a turbofan engine. Various additional aspects and advantages of the present general inventive concept may be achieved in which the internal combustion engine uses gasoline.

Other systems, methods, features and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

A dual drive hybrid electric power plant for aircraft has both an internal combustion engine and an electric motor for driving a propulsion system. The hybrid electric power plant has a primary or hybrid mode of operation and a secondary or electric only mode of operation. During the primary mode, the internal combustion engine and the electric motor form a hybrid system for driving the propulsion system. The electric motor is solidly coupled to the output shaft of the engine and works in conjunction with the internal combustion engine as a starter, power booster, and generator. During the secondary mode, the internal combustion engine is decoupled from the electric motor for the electric motor to drive the propulsion system alone. The dual drive hybrid electric power plant may have a coupling system that allows the coupling and decoupling of the internal combustion engine with the electric motor for the primary and secondary modes, respectively. The coupling system is a mechanical system to allow for the decoupling of the electric motor and internal combustion engine when switching from primary mode to secondary mode for the electric motor alone to drive the propulsion system.

Figure 1:
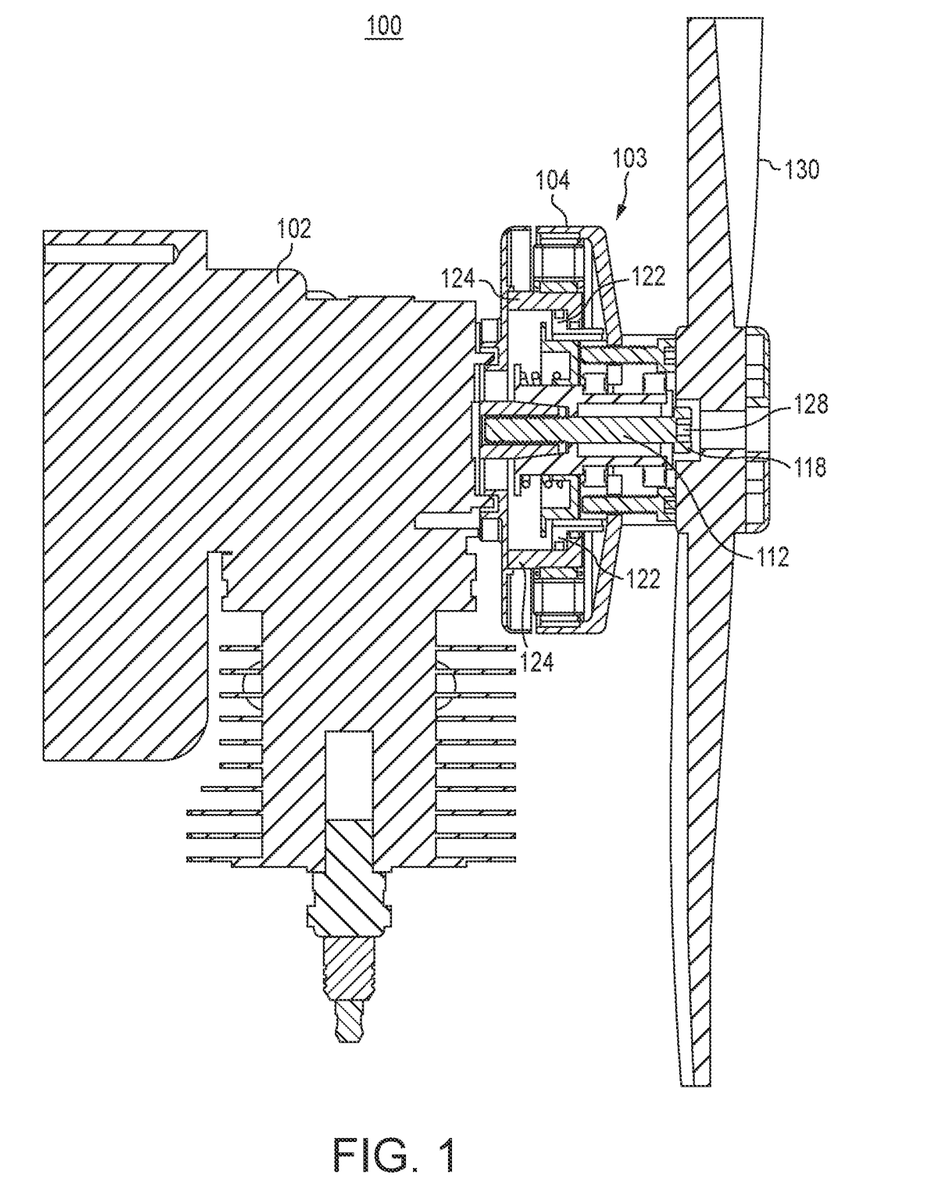
FIG. 1 represents a cross section view of a dual drive hybrid electric power plant in a primary mode.

FIG. 1 represents a cross section view of a dual drive hybrid electric power plant 100 operating in a primary mode. In the primary mode, the dual drive shaft 112 of the internal combustion engine 102 is coupled to the electric motor, and thus power is provided to the propulsion system or assembly 130, including the propeller 134, by both the internal combustion engine 102 and the electric motor 103.

Figure 2:
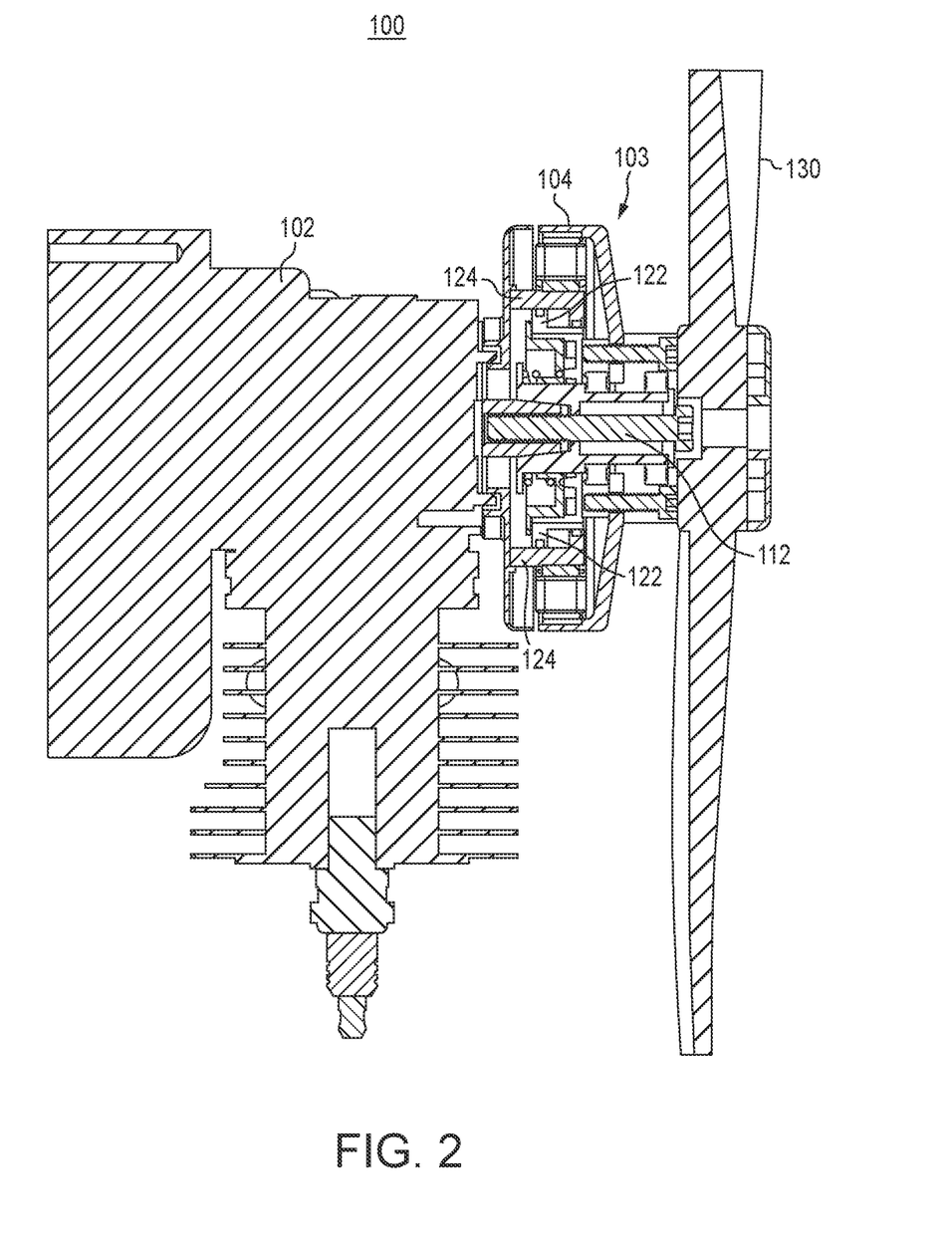
FIG. 2 represents a cross section view of the dual drive hybrid electric power plant of FIG. 1 in a secondary mode.
Figure 3:
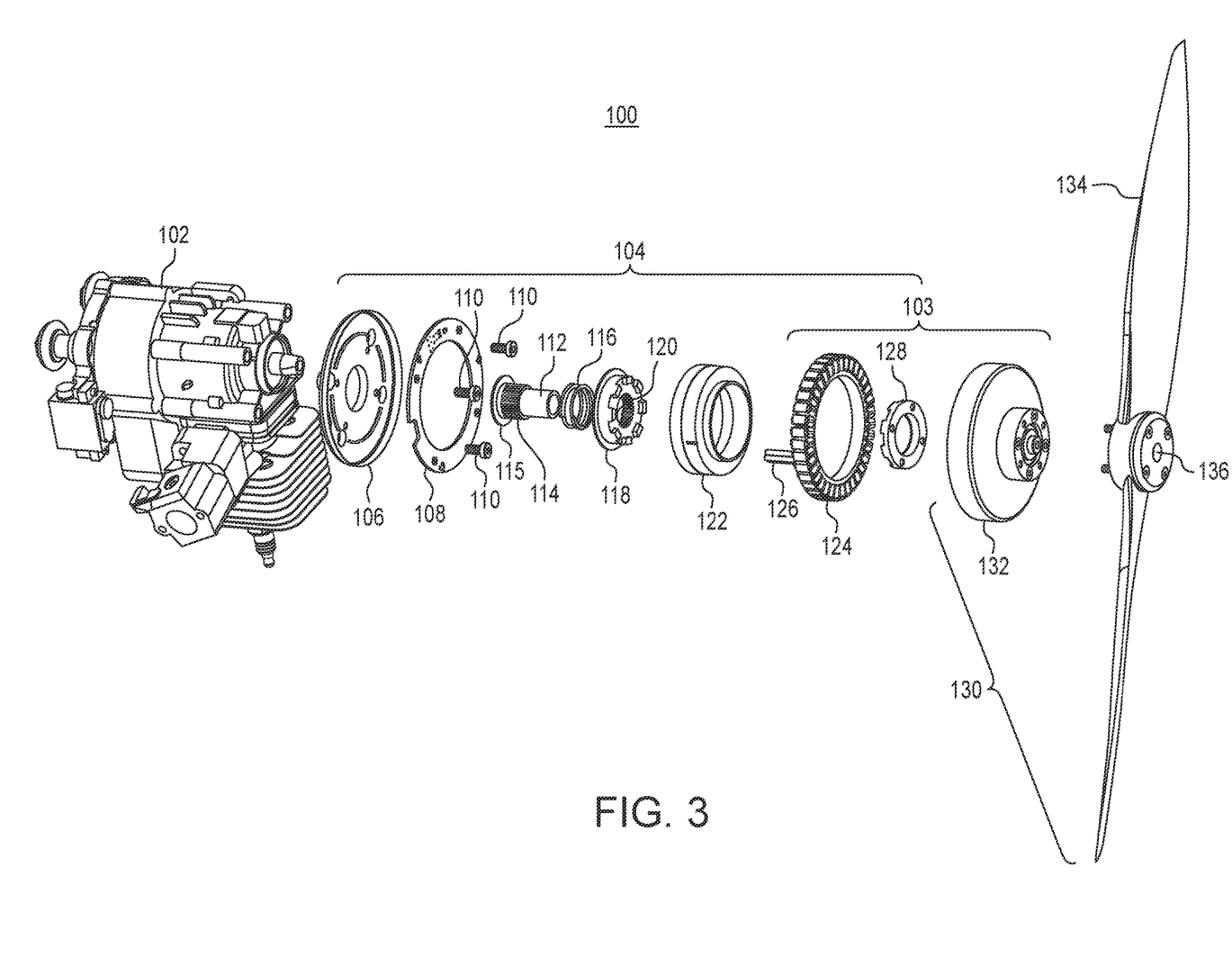
FIG. 3 represents an exploded view of the dual drive hybrid electric power plant of FIG. 1.
Figure 4:
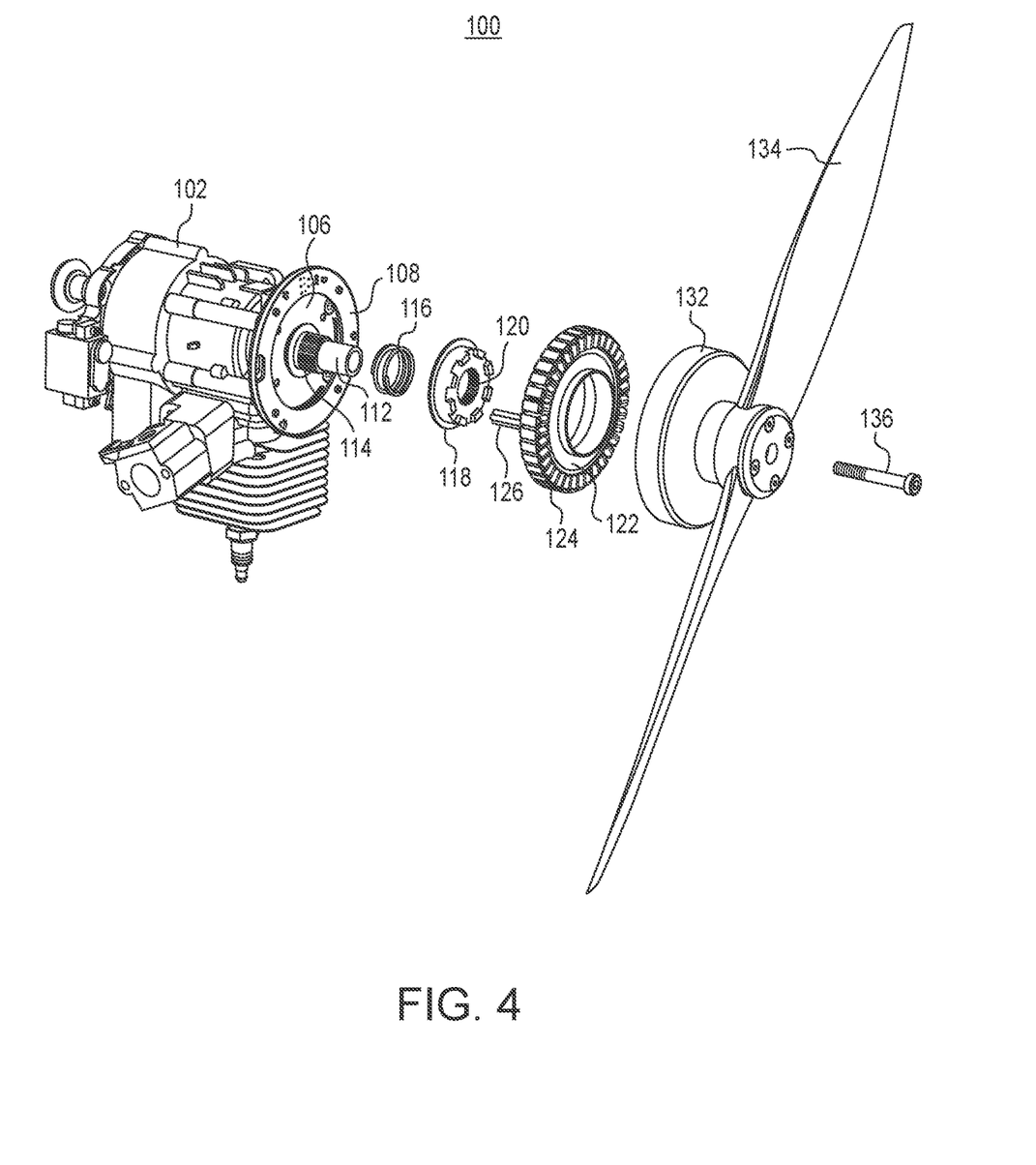
FIG. 4 represents a partially exploded front perspective view of the dual drive hybrid electric power plant of FIG. 1.
Figure 5:
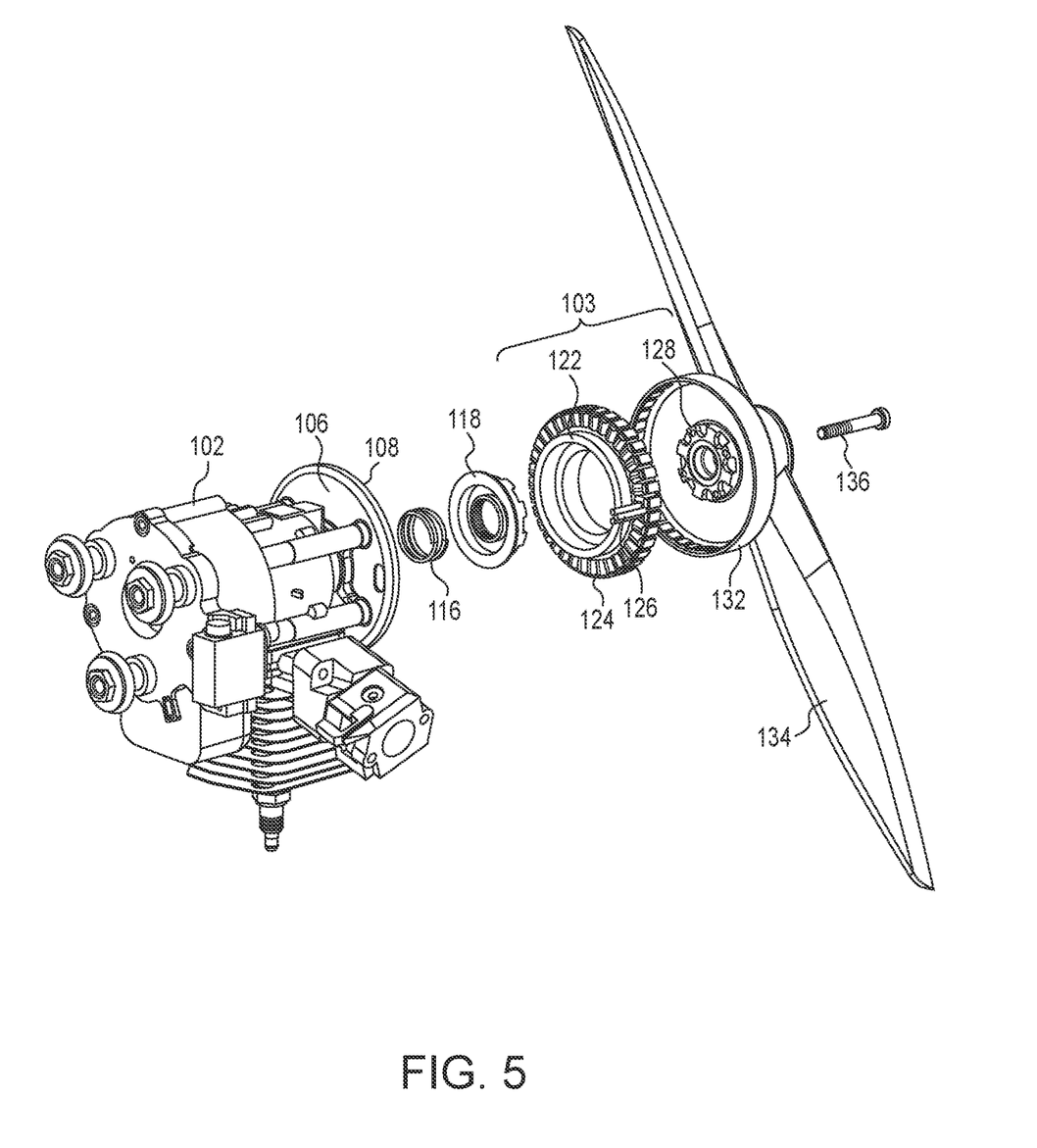
FIG. 5 represents a partially exploded back perspective view of the dual drive hybrid electric power plant of FIG. 1.
Figure 6:
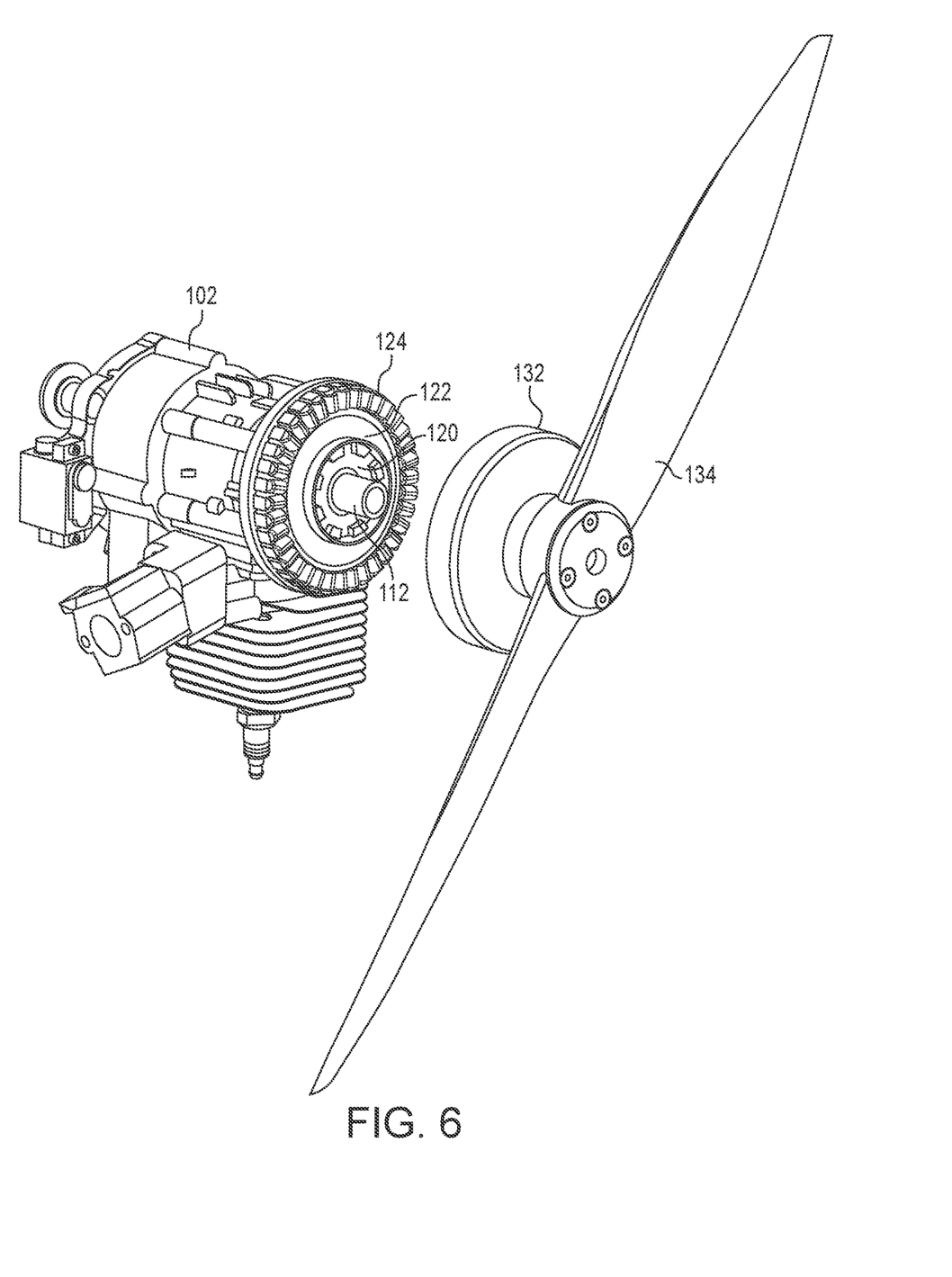
FIG. 6 represents another partially exploded front perspective view of the dual drive hybrid electric power plant of FIG. 1.

FIG. 2 represents a cross section view of the dual drive hybrid electric power plant 100 of FIG. 1 in a secondary mode. In this secondary mode, the dual drive shaft 112 of the internal combustion engine 102 has been decoupled from the electric motor 103 and thus is no longer connected to provide power to the propulsion system 130. All of the power driving the propulsion system or assembly 130 is coming from the electric motor 103, FIG. 3 represents an exploded view of the dual drive hybrid electric power plant 100 of FIG. 1. In the primary mode, the dual drive dog 118, which is attached to the dual drive shaft 112 by the fitting of the shaft spline 114 with the dog spline 120, is biased forward toward the propulsion system 130 to register with the propulsion dog 128 and provide power to the propulsion system or assembly 130 along with the electric motor 103. In the secondary mode, the decoupling actuator 122, which may include an electric motor stator 124 and dual drive piston 126, forces the dual drive dog 118 toward the internal combustion engine 102. The dual drive dog 118 decouples from the propulsion dog 128; thus, the dual drive shaft 112 can no longer drive or contribute to the turning of the propeller 134 in the propulsion system 130. In the secondary mode, only the electric motor 103 is driving the propeller 134. FIG. 4 represents a partially exploded front perspective view of the dual drive hybrid electric power plant 100 of FIG. 1. FIG. 5 represents a partially exploded back perspective view of the dual drive hybrid electric power plant 100 of FIG. 1. FIG. 6 represents another partially exploded front perspective view of the dual drive hybrid electric power plant 100 of FIG. 1.

Figure 7:
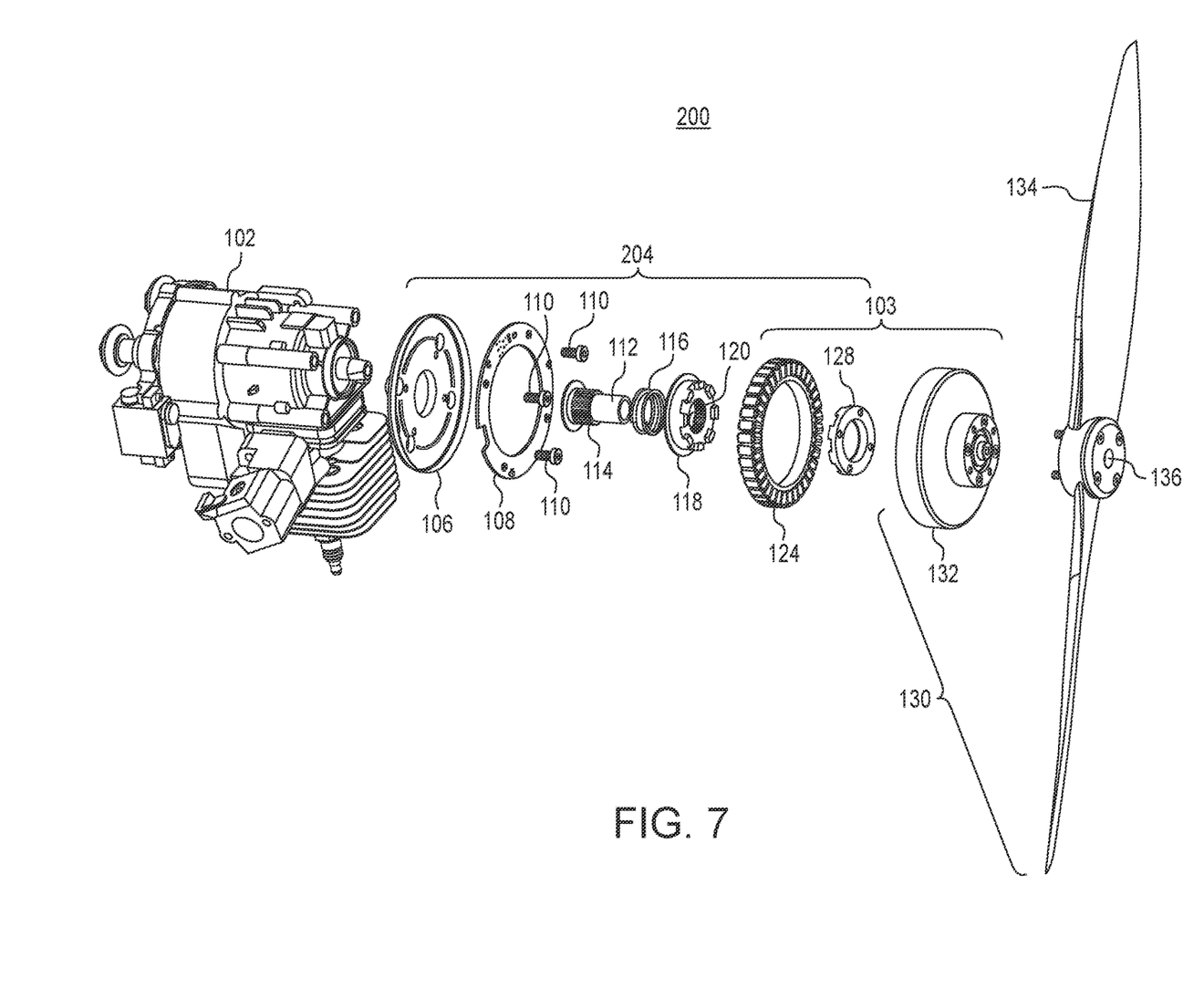
FIG. 7 represents an exploded view of another dual drive hybrid electric power plant.

FIG. 7 represents an exploded view of another dual drive hybrid electric power plant 200 where the dual drive dog 118 engages or registers with the propulsion dog 128 when the dual drive hybrid electric power plant 200 operates either in the primary or secondary mode. In the primary mode, both the internal combustion engine 102 and the electric motor drive the propulsion system or assembly 130. In the secondary mode, the dual drive hybrid electric power plant 200 preferably stops the fuel injection in the internal combustion engine 102. The pistons and/or other moving parts in the internal combustion engine 102 rotate or move as the electric motor rotates the dual drive shaft 112 to drive the propulsion system 130. The electric motor alone drives the propulsion system 130 when the dual drive hybrid electric power plant 200 operates in the secondary mode.

FIG. 1 through FIG. 6 represent various views of a dual drive hybrid electric power plant 100 for an aircraft. The dual drive hybrid electric power plant 100 has an internal combustion engine 102 operatively connected to a dual drive system 104 having an electric motor. A propulsion system or assembly 130 is operatively connected to the dual drive system 104.

The internal combustion engine 102 may be a 2-cycle or 4-cycle engine having one or more pistons and using gasoline for operation. The internal combustion engine may have other engine designs and configurations including a turbofan engine and the like. Other fuels may be used such as kerosene, aviation fuel, natural gas, propane, a combination, or the like.

The propulsion system or assembly 130 includes a propellor 134 connected to a propellor base 132 by a propellor bolt 136. Other propulsion systems may be used including those with different propellor configurations, number of propellors, and bases.

The dual drive system 104 includes a base plate 106 and a Hall sensor 108 (optional) axially mounted by mounting bolts 110 on the internal combustion engine 102. Preferably there are three mounting bolts 110. However, additional or less mounting bolts 110 may be used, even just one mounting bolt 110. A dual drive shaft 444-112 extends from the internal combustion engine 102 toward the propulsion system or assembly 130, and through the axis openings in the base plate 106 and Hall sensor 108. The dual drive shaft 112 forms a shaft spline 114 extending axially on an outside circumference and forms a lip 115 adjacent to the internal combustion engine 102. A compression spring 116 is disposed axially on the dual drive shaft 112 against the lip 115 formed adjacent to the internal combustion engine 102. A dual drive dog 118 is slide-ably disposed on the dual drive shaft 112 away from the internal combustion engine 102. "Slide-ably disposed" means the dual drive dog 118 is positioned to slide axially on the dual drive shaft 112. The dual drive dog 118 engages the compression spring 116 against the lip 115 of the dual drive shaft 112. The dual drive dog 118 has an open internal bore along the axis that forms a dog spline 120 extending axially on an inside circumference. When the dual drive dog 118 slides onto the dual drive shaft 112 (the dual drive shaft 112 extends through the bore of the dual drive dog), the dog spline 120 registers or aligns with the shaft spline 114 and the compression spring is biased between the dual drive dog 118 and the lip 115 of the dual drive shaft 112 adjacent to the internal combustion engine 102. A decoupling actuator 122 forms a cavity that fits around and engages the dual drive dog 118 along a circumferential edge. The electric motor stator 124 is axially aligned along the outside of the decoupling actuator 122. The electric motor stator 124 has a dual drive piston 126 disposed between the electric motor stator 124 and the decoupling actuator, where the dual drive piston 126 has an extended position to engage the decoupling actuator 122 and a nonextended position to not engage the decoupling actuator 122. A propulsion dog 128 is axially mounted on the inside of the propellor base 132.

The compression spring 116, dual drive dog 118, decoupling actuator 122, dual drive piston, and the propulsion dog 128 form a connection system that has a selective connection between the dual drive shaft 112 and the propulsion system 130. "Selective connection" includes both a mechanical connection and a mechanical disconnection between the internal combustion engine 102 and the propulsion system 130. "Selective connection" also includes both a coupled connection and a decoupled connection the dual drive dog 118 and the propulsion dog 128. As discussed below, the connection system causes a mechanical connection between the dual drive shaft 112 and the propulsion system 130 in primary mode, and a mechanical disconnection between the dual drive shaft 112 and the propulsion system 130 in the secondary mode. Similarly, the connection system causes a coupled connection between the dual drive dog 118 and the propulsion dog 128 in primary mode, and a decoupled disconnection between dual drive dog 118 and the propulsion dog 128 in the secondary mode. Other connection systems may be used between the dual drive shaft 112 and the propulsion system 130 and between the dual drive dog 118 and the propulsion dog 128.

During the primary mode of operation, the connection system couples the dual drive dog 118 with the propulsion dog 128. In the primary mode, the dual drive piston 126 has a nonextended position that permits the compression spring 120 to bias the dual drive dog 118 against the propulsion dog 128. The dual drive dog 118 engages or registers with the propulsion dog 128 for the internal combustion engine 102 to drive the propulsion system or assembly 130 in combination with the electric motor.

During the secondary mode of operation, the connection system decouples the dual drive dog 118 from the propulsion dog 128. In the secondary mode, the dual drive piston 126 moves into an extended position that pushes the decoupling actuator 122 against the dual drive dog 118. The decoupling actuator 122 moves the dual drive dog 118 along the dual drive shaft 112 toward the internal combustion engine 102. The dual drive dog 118 disengages from the propulsion dog 128 causing the internal combustion engine 102 to stop driving the propulsion system 130. Then the electric motor alone drives the propulsion system or assembly 130 during the secondary mode.

FIG. 7 represents a view of another dual drive hybrid electric power plant 200 for an aircraft. The dual drive hybrid electric power plant 200 includes has an internal combustion engine 102 operatively connected to a dual drive system 204 having an electric motor. A propulsion system or assembly 130 is operatively connected to the dual drive system 204. The internal combustion engine 102 and propulsion system 130 of FIG. 7 are essentially the same and connected as the internal combustion engine 102 and propulsion system or assembly 130 as previously described in relation to FIG. 1 through FIG. 6. The dual drive system 204 has a base plate 106, a Hall sensor 108 (optional), mounting bolts 110, a dual drive shaft 114 with a shaft spline 114, a compression spring 116, a dual drive dog 118 with an open internal bore along the axis that forms a dog spline 120, an electric motor stator 124, and a propulsion dog 128 that are essentially the same and connected as these components are previously described in relation to FIG. 1 through FIG. 6. The dual drive system 204 preferably does not have the decoupling actuator 122 and the dual drive piston 126 as previously described in relation to FIG. 1 through FIG. 6. If the dual drive system 204 includes the decoupling actuator 122 and the dual drive piston 126 or similar components, such decoupling actuator and dual drive piston are rendered inoperable electrically, mechanically, or a combination.

When the dual drive hybrid electric power plant 200 operates either in the primary or secondary mode, the dual drive dog 118 engages or registers with the propulsion dog 128 in the dual drive system 204. When the dual drive hybrid electric power plant 200 operates in the primary mode, both the internal combustion engine 102 and the electric motor drive the propulsion system or assembly 130. In the secondary mode, the dual drive hybrid electric power plant 200 preferably stops the fuel injection or otherwise ceases to permit the internal combustion engine 102 to drive the propulsion system or assembly 130. The pistons and/or other moving parts in the internal combustion engine 102 rotate or move as the electric motor rotates the dual drive shaft 112 to drive the propulsion system 130. The electric motor is sized or selected to compensate for the drag effect from the internal combustion engine 102 during the secondary mode. The internal combustion engine may need additional or enhanced cooling capabilities to sufficiently dissipate any heat generated during the secondary mode. The electric motor alone drives the propulsion system 130 when the dual drive hybrid electric power plant 200 operates in the secondary mode.

The dual drive hybrid electric power plant can be used to power an aircraft and may include a propulsion assembly, an internal combustion engine having an output shaft configured to drive the propulsion system assembly, an electric motor configured to drive the propulsion system or assembly and to be selectively coupled to the output shaft; and a coupling assembly configured to selectively couple and decouple the electric motor from the output shaft. The electric motor alone drives the propulsion system or assembly when decoupled from the output shaft. The internal combustion engine and the electric motor drive the propulsion assembly when the electric motor is coupled to the output shaft. The bearings in the electric motor may not rotate when the internal combustion engine and the electric motor drive the propulsion system. A decoupling actuator of the coupling assembly may not be in contact with any moving parts of the dual drive hybrid electric power plant when the internal combustion engine and the electric motor drive the propulsion system. The electric motor may work in conjunction with the internal combustion engine as a starter, power booster, and generator when the internal combustion engine and the electric motor drive the propulsion system or assembly. The electric motor may be configured to drive the propulsion system or assembly alone if the internal combustion engine fails. The electric motor may be configured to drive the propulsion system or assembly alone to reduce the noise output of the propulsion system.

A main benefit of the dual drive hybrid electric power plant is that a smaller and lighter internal combustion engine can be used with an electric motor than when no electric motor is used. The internal combustion engine can be sized for the average power demand of the aircraft. The electric motor can assist and smooth out the peak power requirements. Since an aircraft uses dramatically more power for take-offs and climbing (increasing altitude) than it does for cruising (maintain speed and altitude) and landing, the smaller and lighter internal combustion engine in a hybrid electric power plant could be beneficial in aircraft by improving efficiency and reducing fossil-fuel consumption that would reduce costs and greenhouse gas emissions. The size of the internal combustion engine and electric motor need to be sized appropriately so the added weight and complexity of the dual drive hybrid electric power plant does not offset the potential gains in efficiency and cost savings.

The dual drive hybrid electric power plant also provides at least two significant advantages over a conventional system for aircraft. The first advantage is the considerable added safety to aircraft operation from a secondary or backup source of thrust from having both an internal combustion engine and an electric motor that can drive the propulsion system together or separately. If the electric motor is properly sized it can be used as a secondary or backup power source allowing the aircraft to fly on batteries alone. The second advantage is the ability to run essentially silent for the time when the electric motor alone is driving the propulsion system. The internal combustion engine could be decoupled and shut down during flight to provide nearly silent running.

The mechanical arrangement of the components permits the dual drive hybrid electric power plant to be added without requiring any significant amount of additional maintenance. When in primary mode the bearings in the electric motor do not rotate and the decoupling actuator is not in contact with any moving parts. During a catastrophic failure of the internal combustion engine failure, the electric propulsion system will likely remain fully functional as it does not rely on the mechanics of the internal combustion engine to function. In addition, the design does not significantly complicate maintenance and could be integrated onto many existing internal combustion power plants, whether piston or turbine, large or small. Thus, dual drive hybrid electric power plant may be retro-fitted to existing aircraft engines.

To provide a clear and more consistent understanding of the specification and claims of this application, the following definitions are provided.

Unless otherwise indicated, all numbers expressing quantities of ingredients, properties such as amounts, and the like used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed in light of the margin of error, the number of reported significant digits, and by applying ordinary rounding techniques.

Unless the context clearly dictates otherwise, where a range of values is provided, each intervening value to the tenth of the unit of the lower limit between the lower limit and the upper limit of the range is included in the range of values.

The terms "a", "an", and "the" used in the specification claims are to be construed to cover both the singular and the plural, unless otherwise indicated or contradicted by context.

No language in the specification should be construed as indicating any non-claimed element to be essential to the practice of the invention.

Note that spatially relative terms, such as "up", "down", "top", "bottom", "right", "left", "beneath", "below", "lower", "above", "upper", and the like, may be used for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below", or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The simplified diagrams and drawings do not illustrate all the various connections and assemblies of the various components, however, those skilled in the art will understand how to implement such connections and assemblies, based on the illustrated components, figures, and provided descriptions. Numerous variations, modifications, and additional embodiments are possible.

Described methods can be performed in any suitable order unless otherwise indicated or contradicted by context. The progression of fabrication operations described are merely examples, however, and the sequence type of operations is not limited to that set forth and may be changed as is known in the art, with the exception of operations necessarily occurring in a certain order. Also, description of well-known functions and constructions may be simplified and/or omitted for increased clarity and conciseness.

While various aspects of the dual drive hybrid electric power plant are described, it will be apparent to those of ordinary skill in the art that other embodiments and implementations are possible within the scope of the invention. Accordingly, the invention is not to be restricted except in light of the attached claims and their equivalents.

The invention claimed is:

1. A dual drive hybrid electric power plant to power an aircraft, comprising:
   a propulsion assembly;
   an electric motor configured to drive the propulsion assembly;
   an internal combustion engine configured to turn a drive shaft; and
   an actuator configured to selectively couple and decouple the electric motor to and from the drive shaft;
   where the electric motor alone drives the propulsion assembly when decoupled from the drive shaft; and
   where the internal combustion engine and the electric motor cooperate to drive the propulsion assembly when the electric motor is coupled to the drive shaft;
   wherein the actuator is not in contact with any moving parts of the power plant when the internal combustion engine and the electric motor drive the propulsion assembly.

2. A dual drive hybrid electric power plant to power an aircraft, comprising:
   a propulsion assembly;
   an electric motor configured to drive the propulsion assembly;
   an internal combustion engine configured to turn a drive shaft; and an actuator configured to selectively couple and decouple the electric motor to and from the drive shaft;

where the electric motor alone drives the propulsion assembly when decoupled from the drive shaft; and where the internal combustion engine and the electric motor cooperate to drive the propulsion assembly when the electric motor is coupled to the drive shaft;

wherein the electric motor works in conjunction with the internal combustion engine as a starter, power booster, and generator when the internal combustion engine and the electric motor drive the propulsion assembly.

3. The dual drive hybrid electric power plant of claim 1, wherein the electric motor is configured to drive the propulsion assembly alone if the internal combustion engine fails or to reduce the noise output of the propulsion assembly.

4. The dual drive hybrid electric power plant of claim 1, where the electric motor is configured to drive the propulsion assembly alone to reduce the noise output of the propulsion assembly.

5. A dual drive hybrid electric power plant for an aircraft, comprising:
   an internal combustion engine;
   a dual drive system connected to the internal combustion engine, where the dual drive system has:
      an electric motor configured to drive a propulsion system and an actuator configured to mechanically connect and disconnect the internal combustion engine to a driving component of the electric motor, where the internal combustion system and the electric motor drive the propulsion system when the internal combustion engine is mechanically connected to the electric motor, and where the electric motor alone drives the propulsion system when the internal combustion engine is mechanically disconnected from the electric motor;
      a base plate axially mounted on the internal combustion engine by at least one mounting bolt;
      a dual drive shaft extending from the internal combustion engine toward the propulsion system and through an axis opening formed by the base plate, where the dual drive shaft forms a shaft spline extending axially on an outside circumference, where the dual drive shaft forms a lip adjacent to the internal combustion engine;
      a compression spring disposed axially on the dual drive shaft against the lip;
      a dual drive dog slide-ably disposed on the dual drive shaft, the dual drive dog forming an internal bore and forming a dog spline extending axially on an inside circumference of the bore, where the dual drive shaft extends axially through the bore of the dual drive dog, the dog spline registers with the shaft spine, where the dual drive dog engages the compression spring against the lip of the dual drive shaft;
      a decoupling actuator forming a cavity, the decoupling actuator fits around and engages the dual drive dog along a circumferential edge;
      wherein a stator of the electric motor is axially aligned along the outside of the decoupling actuator, wherein the electric motor has a dual drive piston disposed between the stator and the decoupling actuator; and
      a propulsion dog axially mounted on the inside of a propellor base in the propulsion system;
   whereby when the internal combustion engine is mechanically connected to the electric motor, the dual drive dog engages the propulsion dog to allow the dual drive shaft to rotate the propulsion dog and propellor base; and
   whereby when the internal combustion engine is mechanically disconnected from the electric motor, the decoupling actuator slides the dual drive dog along the dual drive shaft to disengage the dual drive dog from the propulsion dog.

6. The dual drive hybrid electric power plant of claim 5, where the dual drive dog has one of a coupled connection and a decoupled disconnection with the propulsion dog.

7. The dual drive hybrid electric power plant of claim 6, where the internal combustion engine and the electric motor drive the propulsion system when the dual drive dog has a coupled connection with the propulsion dog, and where the electric motor alone drives the propulsion system when the dual drive dog has a decoupled disconnection with the propulsion dog.

8. The dual drive hybrid electric power plant of claim 6, where the dual drive piston has an extended position when the dual drive dog has a decoupled disconnection with the propulsion dog, and where the dual drive piston has a nonextended position when the dual drive dog has a coupled connection with the propulsion dog.

9. The dual drive hybrid electric power plant of claim 1, where the internal combustion engine is a 2-cycle engine.

10. The dual drive hybrid electric power plant of claim 1, where the internal combustion engine is a turbofan engine.

11. The dual drive hybrid electric power plant of claim 1, where the internal combustion engine uses gasoline.

12. The dual drive hybrid electric power plant of claim 1, where the propulsion assembly comprises a propellor connected to a propellor base by a propellor bolt.

13. A dual drive hybrid electric power plant for an aircraft, comprising:
   an internal combustion engine;
   a dual drive system having an electric motor, and including:
      a base plate axially mounted on the internal combustion engine by at least one mounting bolt;
      a dual drive shaft extending from the internal combustion engine toward a propulsion system and through an axis opening formed by the base plate, where the dual drive shaft forms a shaft spline extending axially on an outside circumference, where the dual drive shaft forms a lip adjacent to the internal combustion engine;
      a compression spring disposed axially on the dual drive shaft against the lip;
      a dual drive dog slide-ably disposed on the dual drive shaft, the dual drive dog forming an internal bore and forming a dog spline extending axially on an inside circumference of the bore, where the dual drive shaft extends axially through the bore of the dual drive dog, the dog spline registers with the shaft spine, where the dual drive dog engages the compression spring against the lip of the dual drive shaft;
      the electric motor having a stator axially aligned along the outside of the decoupling actuator; and
   the propulsion system having a propellor connected by a propellor bolt to a propellor base, where a propulsion dog is axially mounted inside of the propellor base, where the propulsion dog engages the dual drive dog to allow rotation of the dual drive dog to drive rotation of the propulsion dog, where the internal combustion system and electric motor drive the propulsion system when fuel is injected in the internal compression engine, and where the electric motor alone drives the propulsion system when the fuel is not injected in the internal compression engine.

14. The dual drive hybrid electric power plant of claim 13, where the internal combustion engine is a 2-cycle engine.

15. The dual drive hybrid electric power plant of claim 13, where the internal combustion engine is a turbofan engine.

16. The dual drive hybrid electric power plant of claim 13, where the internal combustion engine uses gasoline.

* * * * *